June 30, 1970            V. NIKOLIC            3,518,094
CONTINUOUS PRODUCTION OF TELEMEA CHEESE
Filed Oct. 24, 1966
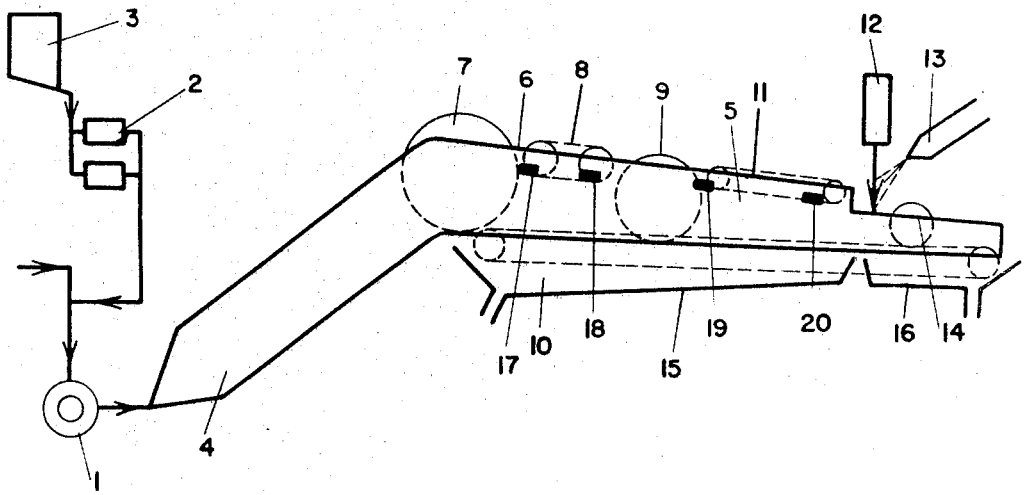
INVENTOR
Vasilie Nikolič
BY
Karl J. Ross
ATTORNEY

United States Patent Office 3,518,094
Patented June 30, 1970

3,518,094
CONTINUOUS PRODUCTION OF TELEMEA CHEESE
Vasilie Nikolic, Bucharest, Romania, assignor to Ministerul Industriei Alimentare, Bucharest, Romania, a corporation of Romania
Filed Oct. 24, 1966, Ser. No. 588,924
Claims priority, application Romania, Nov. 16, 1965, 50,550
Int. Cl. A23c *19/02*
U.S. Cl. 99—116   4 Claims

ABSTRACT OF THE DISCLOSURE

Telemea cheese is made by a process wherein milk is curdled and coagulated in a continuous manner concurrently with pressing of the curd and portioning of the cheese along a linear coagulation and pressing path such that the curd retains its original stratification.

---

The present invention relates to a process for making telemea cheese in a continuous manner starting from the phase of introducing rennet into the milk and including the phase of portioning the telemea cheese blocks.

There are known various methods for making cheese in a continuous process including a curd treatment using grains and treatments involving crushing the curd by means of cutting devices, laminar conveying of the curd in the renneting phase only in the vertical direction, and shaping the cheese blocks in molds. The disadvantage of treating curd in grain in the case of making telemea cheese in that a nonhomogeneous product is obtained having isotropic properties with respect to its structure while telemea cheese should in fact be a product having an anisotrope structure. Attempts were made for partial mechanization and improvements in the technology of certain phases of making telemea cheese. Thus, there are known processes for crushing the curd in a cheese vat followed by drawing it out by means of large curd scoops or pails and pouring it onto a curd draining table, pressing it in molds, and coagulating it directly on a curd-draining table lined with polyethylene sheet. In fact, all these processes do not truly mechanize the cheese-making process which remains a manual process in other stages, but they represent only the improvement of technological operations or phases, leading in the end to discontinuous stages. The continuous processes, whose coagulation phase takes place in ascendent vertical direction, are not suitable for telemea-cheese production because of the fact that they cannot carry out the transition to the treatment and pressing phases which take place in an horizontal and descendent vertical direction because it is not possible to maintain the integrity of the curd when the direction changes produce the breaking of the curd. As a result, the bedding of the milk cannot be maintained unchanged from coagulating phase up to the obtaining of the finished product. All the attempts to modify telemea-cheese-making processes by passing the curd through a curd crushing phase produced a cheese having pressing caverns, a low conservation index and an unsatisfactory quality.

According to the present invention, the process and the unit avoid these disadvantages in that milk coagulation, cutting, pressing and portioning the curd and telemea cheese are carried out in a continuous flow by laminar and rectilinear displacement of the product, by using a unit consisting of a feeding means whereby the coagulation solution is injected into milk, the mixture is homogenized and then introducing it into a coagulation body in the form of an inclined tube in which the coagulation of milk is carried out. The tube is connected to the treatment body in which are successively carried out the first cutting, the first pressing, the second cutting, the final pressing, the portioning and cheese-cooling stages, the displacement being effected by an inclined conveying belt, and the pressing by means of other inclined pressing belts being gradually reduced during the displacement with respect to the conveying belt.

An example of the application of the invention is described with reference to the sole figure of the drawing representing a schematical view of the unit.

The unit consists of a centrifugal milk pump 1, two metering pumps 2 for the coagulation solution, a tank 3 for the coagulation solution, a coagulation body 4 inclined at 25°–35° to the horizontal, stiffly connected with a treatment body 5 consisting of two lateral walls 6 between which are provided: a set of knives-revolving disks 7, a short pressing belt 8, a second set of knife-revolving disks 9, a conveyor belt 10, a belt for final pressing 11, a guillotine cutter 12 with hydraulic drive for transverse cutting, a set of nozzles 13 for cool water spraying, another set of disk knives 14, a trough 15 for collecting whey and a trough 16 for collecting cooling water. The lateral walls 6 are provided with orifices 17, 18, 19, and 20 for eliminating the whey. The belts and the knives are synchronistically driven but it is possible to vary the treatment rhythmicity within ±20% with respect to the average.

The process of cheese making is as follows:

Milk is prepared for coagulation by pasteurization, addition of correction agents (calcium chloride, starting culture, and possibly also alkaline nitrates), the acidity is brought (in terms of density degrees in the Thömer system) to 20°–22° T. by means of diluted lactic or hydrochloric acids and the temperature is established to 28.5–30.5° C. The coagulation solution is simultaneously prepared by dissolving rennet in water. The concentration of the coagulation solution is determined by means of the relation:

$$c = \frac{100k \times D \times Pr}{d}$$

where:

c is the concentration of the coagulation solution, as percent
k—a correction factor of the passage from coagulation in static state to coagulation in flow state (a non-dimensional coefficient).
D—the flow rate of the milk pump, in l./hr.
Pr—the relative strength of rennet expressed as conventional unities (kg./l.)
d—the flow rate of the coagulation solution pumps, in l./hr.

The correction factor determined by experiment for this method for telemea cheese making is k=1.4–1.8.

The notion of relative coagulation strength is necessary in order to express the strength of rennet which is related to a certain quality of the milk to be treated in the technologic conditions prescribed for the named process.

The quantity of the coagulation solution is determined by the relation:

$$Q = \frac{1.1 \times L \times d}{D}$$

where:

Q is the quantity of the coagulation solution in liters;
L—the quantity of milk in liters which is to be treated after adding the correction agents;
D and d—have the same meaning as above.

The required quantity of rennet is calculated from the values of c and Q.

When milk and the coagulation solution are prepared, the pumps 1 and 2 are operated. Milk enters the lower part of the coagulation body 4 by flowing upwards in the form of a laminar, linear, and uniform flow over a period of 30–35 minutes. When it arrives in front of the knives 7, the curd advances and is cut vertically by the blades of the knife-disks and crosswise by the wires, which join the borders of the outside disks within 10 cm. The cut curd is taken up by the conveyor belt 10 and carried under the treatment devices. The belt 8 exerts a light gradual pressure and the whey is separated and eliminated in the upper part of curd, by draining it through the orifices 17 and 18. The fused curd is cut again by the set of knife disks 9 which are closer together than the former set. The eliminated whey is drained by decantation through the lateral orifice 19. The curd is then pressed by the belt 11 and the whey separated is eliminated through the orifice 20. A strip of curd is obtained whose width depends on the transversal sizes of the unit and which must be a multiple of the block sizes. The strip of cheese is transversely cut by the guillotine cutter which is hydraulically driven by circulating water. The disk-knives set 14 cuts longitudinally the transversal pieces of cheese by obtaining blocks of telemea cheese. The whey drained is collected by the trough 15 and the cooling water after spraying the blocks obtained by cutting is collected in the trough 16.

The last portion of curd is drawn out from the coagulation body by pumping a solution of 10% salt sodium chloride through the milk flow line.

What is claimed is:
1. A process for continuously making telemea cheese, comprising the steps of:
 (a) continuously mixing milk with a coagulation solution to form a mixture, and feeding said mixture to the lower portion of a coagulation body inclined to the horizontal at an acute angle;
 (b) continuouslly passing the mixture in the form of a laminar linear and uniform flow during which a coagulum is formed and continuing to move the coagulum upwardly without relative movement of portions of the body of coagulum such that the body of coagulum is advanced in a continuous laminar flow while maintaining its original stratification to form a curd;
 (c) introducing the curd formed in step (b) into a treatment body upon the curd reaching the top of said inclined coagulation body and cutting the curd;
 (d) continuously transferring the cut curd along a generally horizontal path while pressing said curd between a pair of surfaces moving therewith to cause separation of whey and fusion of the curd, cutting the fused curd, and further transferring the cut fused curd along said horizontal path while pressing it between two moving surfaces to eliminate additional whey, the entire treatment of the curd in step (d) being carried out in continuous flow by laminar and rectilinear displacement while maintaining said original stratification; and
 (e) portioning the curd emerging from between the pressing surfaces of step (d) by cutting it longitudinally and transversely to obtain blocks of telemea cheese.

2. The process defined in claim 1 wherein the dosage of the coagulation solution into the milk is carried out with the relations $$c = \frac{100k \times D \times Pr}{d}$$

where:

$c$ is the concentration of the coagulation solution in percent,
$k$ is a correction factor of the passage from static coagulation to coagulation in flow state,
$D$ is the flow rate of the milk pumps in l./hr.
$Pr$ is the relative coagulation strength of rennet expressed in kg./l., and
$d$ is the flow rate of the coagulation solution pumps in l./hr.;

and:

$$Q = \frac{1.1 \times L \times d}{D}$$

where:

$Q$ is the quantity of the coagulation solution in liters,
$L$ is the quantity of milk in liters, which is to be treated after addition of any correcting agents, and
$D$ and $d$ have the same meanings as given above, the milk being brought to the temperature of 28.5–30° C. and to an acidity between 20–22° T.

3. The process defined in claim 2 where the correction factor of the passage from the static coagulation to the coagulation in flow state is usually comprised between 1.4 and 1.8.

4. The process defined in claim 1 wherein the elimination of the last portion of curd from the coagulation body is effected by pumping an aqueous salt solution having a concentration of over 10% in the milk line.

References Cited

UNITED STATES PATENTS 3,394,011  7/1968  Richardson et al. _____ 99—116

LIONEL M. SHAPIRO, Primary Examiner

D. M. NAFF, Assistant Examiner

U.S. Cl. X.R.

31—46, 89; 99—243